(12) United States Patent
Pfeilschifter et al.

(10) Patent No.: US 11,677,257 B2
(45) Date of Patent: *Jun. 13, 2023

(54) VEHICLE-SIDE CHARGING CIRCUIT

(71) Applicant: Vitesco Technologies GmbH, Hannover (DE)

(72) Inventors: Franz Pfeilschifter, Munich (DE); Martin Goetzenberger, Munich (DE); Manuel Brunner, Munich (DE)

(73) Assignee: Vitesco Technologies GmbH, Hannover (DE)

( * ) Notice: Subject to any disclaimer, the term of this patent is extended or adjusted under 35 U.S.C. 154(b) by 319 days.

This patent is subject to a terminal disclaimer.

(21) Appl. No.: 17/256,302

(22) PCT Filed: May 23, 2019

(86) PCT No.: PCT/EP2019/063383
§ 371 (c)(1),
(2) Date: Dec. 28, 2020

(87) PCT Pub. No.: WO2020/001873
PCT Pub. Date: Jan. 2, 2020

(65) Prior Publication Data
US 2021/0265855 A1    Aug. 26, 2021

(30) Foreign Application Priority Data
Jun. 28, 2018    (DE) .......................... 102018210579.0

(51) Int. Cl.
*H02J 7/02* (2016.01)
*B60L 53/22* (2019.01)
(Continued)

(52) U.S. Cl.
CPC ................ *H02J 7/02* (2013.01); *B60L 53/14* (2019.02); *B60L 53/22* (2019.02); *H02J 7/14* (2013.01);
(Continued)

(58) Field of Classification Search
CPC . H02J 7/02; H02J 7/14; H02J 2207/20; B60L 53/14; B60L 53/22; B60L 2210/10;
(Continued)

(56) References Cited

U.S. PATENT DOCUMENTS 9,812,895 B2    11/2017  Kawamura et al.
2010/0220501 A1   9/2010  Krause
(Continued)

FOREIGN PATENT DOCUMENTS

JP    2015076972 A    4/2015
WO    2016105343 A1   6/2016

OTHER PUBLICATIONS

R. Giri et al, "Common-duty-ratio control of input-series connected modular DC-DC converters with active input voltage and load-current sharing", IEEE Transactions on Industry Applications.,Band 42, Nr. 4, Jul. 1, 2006 (Jul. 1, 2006), pp. 1101-1111, XP055610033, DOI: 10.1109/TIA.2006.876064 external link, ISSN:0093-9994, p. 1101, col. 2, Paragraph 3; Illustration 1.
(Continued)

*Primary Examiner* — Paul Dinh
(74) *Attorney, Agent, or Firm* — Laurence A. Greenberg; Werner H. Stemer; Ralph E. Locher

(57) ABSTRACT

A vehicle-side charging circuit includes an AC-voltage interface, a rectifier connected thereto and at least one first and one second DC-to-DC converter. The DC-to-DC converters are electrically isolating, and each have at least one intermediate circuit capacitor and at least one switch unit. The charging circuit also includes an on-board electrical
(Continued)

system connection. The rectifier is connected to the on-board electrical system connection by way of the DC-to-DC converters. The charging circuit has a switch device which connects the DC-to-DC converters so as to be switchable between one another. In a first switching state, the switching device connects the two intermediate circuit capacitors and the switching units of the DC-to-DC converters in parallel and, in a second switching state, connects the intermediate circuit capacitors and the switch units in series.

10 Claims, 1 Drawing Sheet

(51) Int. Cl.
    *B60L 53/14*         (2019.01)
    *H02J 7/14*          (2006.01)
    *H02M 3/158*       (2006.01)

(52) U.S. Cl.
    CPC .......... *H02M 3/158* (2013.01); *B60L 2210/10* (2013.01); *B60L 2210/30* (2013.01); *H02J 2207/20* (2020.01)

(58) Field of Classification Search
    CPC .... B60L 2210/30; H02M 3/158; Y02T 10/70; Y02T 10/7072; Y02T 10/92; Y02T 90/14
    USPC .......................................................... 320/109
    See application file for complete search history.

(56) References Cited

U.S. PATENT DOCUMENTS

| | | |
|---|---|---|
| 2016/0204648 A1 | 7/2016 | Kawamura et al. |
| 2020/0016991 A1* | 1/2020 | Miliani ..................... H02J 7/02 |
| 2020/0106367 A1* | 4/2020 | Bendani .................. B60L 53/22 |

OTHER PUBLICATIONS

M Hartmann et al, "Three-Phase Unity Power Factor Mains Interfaces of High Power EV Battery Charging Systems", Valencia, Spain Mar. 22, 2011 (Mar. 22, 2011), Retrieved from: URL:https://pdfs.semanticscholar.org/6413/77f5ab616ea45e263b418835ba27d946a978.pdf, XP055610122, [Found on Jul. 31, 2019], 5-7, 10, pp. 4,5,8,30.

TI Designs: TIDM-1007, Interleaved CCM Totem Pole Bridgeless PFC Reference, Design Using C2000™ MCU, Texas Instruments Release Date: May 2018, accessed on the Internet at: http://www.ti.com/tooi/TIDM-1007 am May 23, 2019.

Stengert, Katja, On-board 22 kW fast charger "NLG6", 2013 World Electric Vehicle Symposium and Exhibition (EVS27) Year: 2013 |Conference Paper |Publisher: IEEE.

Andreas Greifelt et al.: "Modular 11kW bidirectional onboard charger with SiC-MOSFET technology for mobile applications", 2017 Brazilian Power Electronics Conference (COBEP) Year: 2017, Conference Paper, Publisher: IEEE.

\* cited by examiner

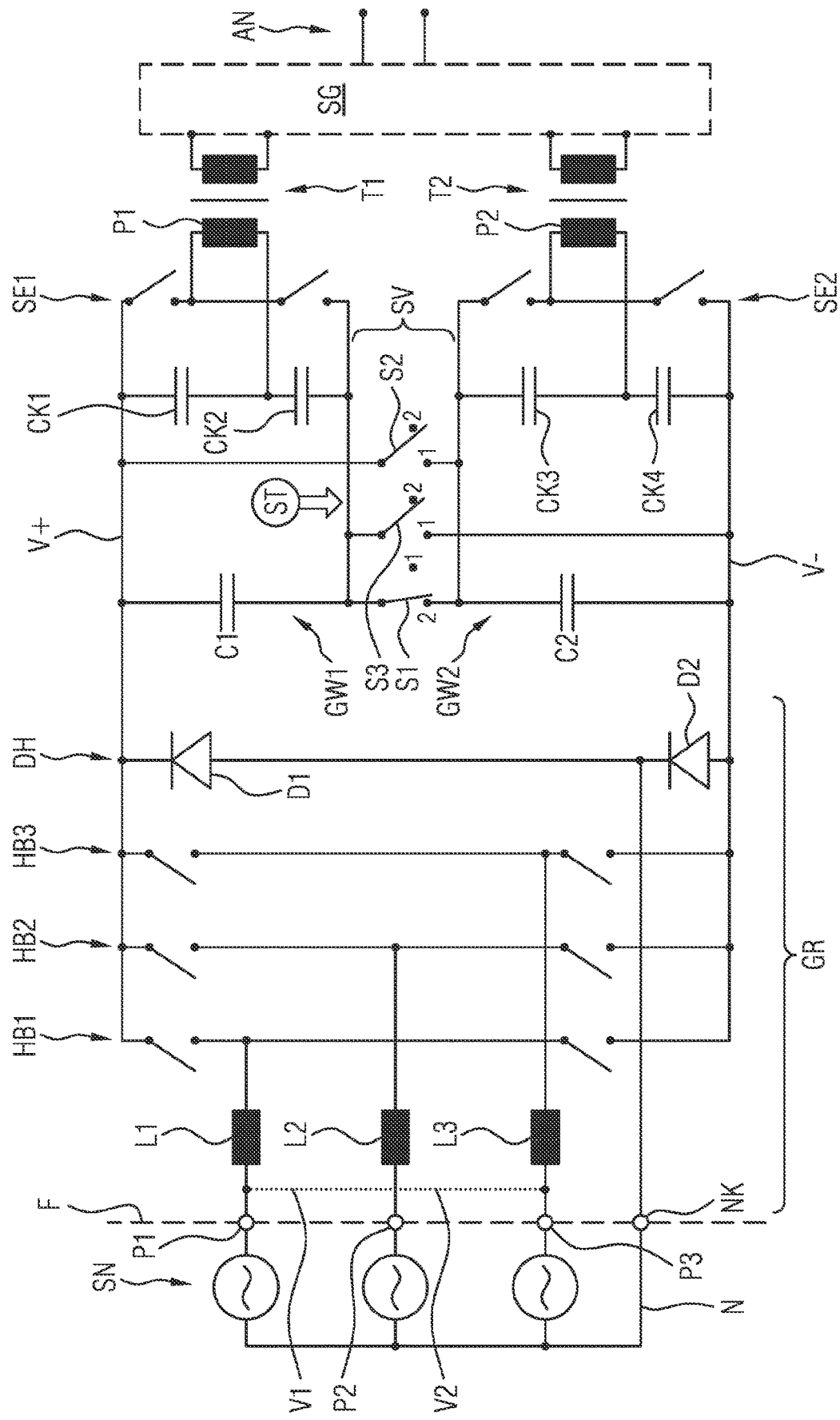

VEHICLE-SIDE CHARGING CIRCUIT

BACKGROUND OF THE INVENTION

Field of the Invention

Vehicles having an electrical drive have a rechargeable battery in order to supply the drive. A charging socket is provided in numerous vehicles in order to transmit energy from the outside to the rechargeable battery, for instance as part of a charging operation.

When a vehicle is connected to an AC voltage network, a plurality of electrical parameters which influence operating variables such as the voltage or power of the charging circuit may vary. These variable parameters are, for example, the number of phases, which depends on the configuration of the AC voltage connection, and the voltage or configuration of the AC voltage network, which may vary regionally.

SUMMARY OF THE INVENTION

The object is therefore to show a possibility, with which different forms of AC voltage connections can be used as cost-effectively as possible to charge a vehicle.

This object is achieved by means of the subject matter of as claimed. Further embodiments, features, properties and advantages emerge from the dependent claims, the description and the figures.

A vehicle-side charging circuit is proposed, in which a plurality of (DC-isolating) DC/DC converters can be connected in parallel or in series with one another by means of an adjustable switch apparatus in order to thus be able to adapt the charging circuit to the form (for instance: single-phase or multiphase) of the connection to an AC voltage network. A rectifier of the charging circuit is connected downstream of an AC voltage interface of the charging circuit and rectifies the voltage applied to the AC voltage interface. The rectified voltage (or its peak value) depends on the number of phases of the AC voltage interface. In the case of a 230 V network and a three-phase connection configuration, the result may therefore be a rectified voltage which is above a cut-off nominal voltage which can be achieved using a particular semiconductor technology. In order to provide, for the semiconductors of the DC/DC converters, a cut-off nominal voltage which does not restrict the technologies which can be used, the switch apparatus can connect the plurality of DC/DC converters in series with one another in this case. As a result, the operating voltage for each DC/DC converter is divided by the number of the latter. In the case of two DC/DC converters, the operating voltages with which the semiconductors of the DC/DC converters each operate are halved. In the case of single-phase operation, the DC/DC converters can be connected in parallel in order to thus multiply the current-carrying capacity.

The vehicle-side charging circuit is equipped with an AC voltage interface and a rectifier which is connected to the latter. The AC voltage interface is, in particular, a plug-in connection element having a plurality of contacts. The rectifier has the function of rectifying, but, in addition to this function, may also have further functions such as power factor correction or harmonic filtering in some embodiments; in particular, the rectifier is an active rectifier. The rectifier has an AC voltage side. The rectifier is connected to the AC voltage interface by way of said AC voltage side.

The rectifier preferably comprises at least one half-bridge (which may be controllable or may be a diode half-bridge) for each phase contact of the AC voltage interface. The AC voltage interface may have a neutral conductor contact. The latter is preferably connected to a (separate) half-bridge of the rectifier. This half-bridge differs from a half-bridge which is connected to a phase of the AC voltage interface and may be a diode half-bridge, in particular.

The rectifier also comprises a DC voltage side. The half-bridges of the rectifier are connected to said DC voltage side. The DC voltage side comprises, in particular, two DC voltage potentials or rails. The half-bridges are connected to the latter (in which case the two ends of the half-bridges, in particular, are connected here to these potentials or rails).

A plurality of DC-isolating DC/DC converters are connected to the rectifier (or to its DC voltage side). The type of connection (parallel or series), by which the DC/DC converters are connected to the rectifier, can be adjusted by means of a switch apparatus. The switch apparatus connects the DC/DC converters to one another in a switchable manner. Different switching positions of the switch apparatus are linked to different connections of the rectifier, on the one hand, and of the DC/DC converters, on the other hand.

The DC/DC converters (in particular that side of the DC/DC converters which has the intermediate circuit capacitor) can be selectively connected in parallel or in series with one another by means of the switching apparatus. In particular, those sides of the DC/DC converters which face the rectifier can be adjustably connected in parallel or in series with one another by means of the switching apparatus.

These sides can correspond to the input sides of the DC/DC converters, in particular during a charging operation. In the case of feedback (that is to say in the case of bidirectional DC/DC converters), the sides correspond to the outputs of the DC/DC converters.

The switching apparatus allows the inputs (in particular based on a charging operation) of the DC/DC converters to be connected in series or in parallel with one another. Since the DC/DC converters are connected to the rectifier, the type of connection between the DC/DC converters and the rectifier can therefore be adjusted by means of the switching apparatus. In the case of a connection in series, half the operating voltage (based on the rectified voltage) results in the case of two DC/DC converters, with the result that the switch elements and the intermediate circuit capacitors must be designed only according to this half operating voltage (or operating voltage divided by the number of converters). The DC/DC converters have a side facing the rectifier. These sides of the DC/DC converters are selectively or switchably (or adjustably) connected in parallel or in series with one another by means of the switching apparatus. The intermediate circuit capacitors are located on these sides and are therefore adjustably connected in parallel or in series with one another. This also applies to the switch units of the DC/DC converters.

The rectifier is connected to the vehicle electrical system connection via the DC/DC converters. The vehicle electrical system connection is, in particular, a high-voltage connection and is therefore designed for operating voltages of >60 V, in particular for at least 400 V, 600 V or 800 V. A vehicle electrical system having the charging circuit described here also comprises a rechargeable battery which is connected to the vehicle electrical system connection. In addition to the rechargeable battery, further components may be connected to the vehicle electrical system connection. The vehicle electrical system connection may be connected to the DC/DC converters via isolating switches.

The first and second DC/DC converters may each be provided with a transformer or with at least one primary winding. The transformer or the primary coil is connected to the switch unit of the relevant DC/DC converter. The first transformer or a first primary winding of the first DC/DC converter is connected to the switch unit of the first DC/DC converter. A second transformer or a second primary winding is connected to the switch unit of the second DC/DC converter. The transformer forms the DC/DC converters as DC-isolating DC/DC converters. The transformer or the primary winding is connected to a connection point, via which the switch units of the respective DC/DC converter are connected to one another. This connection point corresponds to an intermediate tap. Provision may be made for the transformer or the primary winding to have two ends, wherein a first end thereof is connected to the connection point between the switch units and a second end thereof is connected to a connection point of two capacitors which are connected in series with one another.

The connected capacitors form a series circuit. This series circuit is connected in parallel with the switch units. The switch units are, in particular, two switch units which are connected to one another via the connection point. The result is a series circuit of the switch units which is connected in parallel with the series circuit of the capacitors. In other words, one end of the primary winding or of the transformer is connected to the AC voltage side or to the connection point of the switch units, and another end is capacitively connected to at least one DC voltage potential or a supply potential of the relevant rectifier. This preferably applies to all or both DC/DC converters. The primary winding mentioned here is the primary winding of the transformer. The transformer comprises at least one further winding, namely at least one further secondary winding, which is DC-isolated from the primary winding and is magnetically coupled to the latter. Each DC/DC converter preferably has its own transformer. Provision may be made for the same transformer to be used for a plurality of DC/DC converters or for all DC/DC converters, wherein each DC/DC converter is preferably connected to a separate primary winding of the same transformer.

A secondary rectifier is provided between the vehicle electrical system connection and the DC/DC converters, in particular between the vehicle electrical system connection and the transformers (or the transformer). This is a different rectifier to that which is provided between the AC voltage interface and the rectifiers. The secondary rectifier which is between the vehicle electrical system connection and the DC/DC converters or transformers is consistently referred to as a secondary rectifier below and can therefore also be linguistically distinguished from the above-mentioned rectifier (between the AC voltage interface and the DC/DC converter, which can also be called an input rectifier). The secondary rectifier comprises a first side, in particular an AC voltage side, which is connected to the transformers, in particular to the secondary windings. The secondary rectifier therefore has an AC voltage interface which faces the DC/DC converters. The secondary rectifier also has a DC voltage side which is connected to the vehicle electrical system connection. The secondary rectifier comprises at least a first and a second rectifier circuit, in particular a rectifier circuit for each DC/DC converter. The first rectifier circuit is connected to the first DC/DC converter in a DC-isolated manner, in particular via the DC-isolating transformer. The second rectifier circuit is connected to the second DC/DC converter in a DC-isolated manner, in particular via the second transformer.

The DC voltage sides of the rectifier circuits of the secondary rectifier are connected in parallel with one another, but may also be connected in series. The secondary rectifier may have at least one smoothing capacitor which is provided on the side of the secondary rectifier which is connected to the vehicle electrical system connection. In particular, the AC voltage sides of the rectifier circuits of the secondary rectifier are connected to one or more smoothing capacitors.

The DC/DC converters are provided for the purpose of chopping the voltage received from the rectifier or from the side of the AC voltage interface in order to thus excite the primary windings or the relevant transformers. However, since this is carried out in order to generate a DC voltage, the switch units, together with the intermediate circuit capacitors, are referred to as DC/DC converters since they contribute to the DC/DC conversion. The transformers and the secondary rectifier are also used for the DC/DC conversion, with the result that the DC/DC converters, the transformers and the secondary rectifier can together be considered to be a DC/DC conversion unit. In this context, the DC/DC converters which comprise the intermediate circuit capacitors and the switch units can also be considered to be choppers with an intermediate circuit, which are followed by a DC-isolated secondary rectifier. Another designation for the DC/DC converters which each comprise the intermediate circuit capacitor and the switch units would therefore be "choppers".

The switch units of the first and second voltage converters each comprise two switches which are connected in series. These switches are preferably semiconductor switches, for example transistors. Since the overall voltage of the rectifier is divided by virtue of the division into a plurality of DC/DC converters, it is possible to use transistors having a maximum voltage of less than 650, 700 or 600 volts, for example so-called "superjunction FETs". This applies, in particular, to a 230 volt network if it is connected to the charging circuit in a three-phase manner, with the result that it is not necessary to equip the DC/DC converters with transistors which must be designed with higher maximum voltages. As a result, it is possible to dispense with SiC MOSFETs, for example, which constitute a significant cost factor. Transistors such as MOSFETs or IGBTs, in particular, are suitable as switch units.

The rectifier preferably has one or more switchable half-bridges. The half-bridges are fully switchable, in particular, that is to say each consist of a series circuit comprising two switches such as transistors. The half-bridges and their connection points or intermediate taps are connected to the AC voltage interface directly or via series inductances, in particular. In the case of a connection via respective series inductances, the result is a power factor correction circuit which has both a rectifying function and a voltage-converting function, in particular a step-up conversion function. The rectifier between the AC interface and the DC/DC converters is therefore preferably an active rectifier and, if it is equipped with series inductances as described, can also perform a correcting function with respect to the power factor and/or may have a harmonic-attenuating effect.

The AC voltage interface may have a single-phase configuration or preferably has a multiphase configuration, for example a three-phase configuration. The rectifier between the AC voltage interface and the DC/DC converters therefore preferably also has a single-phase, multiphase or, in particular, three-phase configuration. The number of phases of the AC voltage interface preferably corresponds to the number of phases of the rectifier which is connected downstream of the AC voltage interface. The number of phases of the AC voltage interface preferably corresponds to the number of phases of the rectifier. The number of phases of the rectifier preferably corresponds to the number of (switchable) half-bridges of the rectifier. Provision may be made for an additional half-bridge in the form of a diode half-bridge to also be provided. In this case, the rectifier comprises a number of (switchable) half-bridges and an additional half-bridge which is in the form of a diode bridge, in particular.

Hard-wired or switchable connections may be provided between the phases of the AC voltage interface. These preferably connect all phases to one another if the interface itself is used or operated only in a single-phase manner. Otherwise, the connections are not present or are open. In the case of multiphase or three-phase use of the AC voltage interface, the connections are not provided or are open. The connections therefore allow a configuration and, in particular, the distribution of the current to be carried over all half-bridges of the rectifier, even in the case of only single-phase use of the AC interface. The AC voltage interface is therefore equipped with a plurality of phase contacts. The phase contacts are connected to one another by means of connections in a single-phase state. The phase contacts are individually connected to the individual half-bridges, that is to say to the individual half-bridges of the rectifier, in a multiphase state. The phases of the AC voltage interface are not connected to another in the multiphase state.

The connections may be provided by semiconductor switches, electromechanical switches or hard-wired, removable connection elements which are in the form of bridges, for example, which can be plugged onto pins and can be removed therefrom. The last-mentioned possibility makes it possible to easily and cost-effectively select a configuration without having to change the rest of the circuit in order to thus adapt the charging circuit to single-phase or multiphase switching.

The charging circuit may also have a controller. This controller is connected to the switch unit in a controlling manner. The controller can therefore set whether the DC/DC converters are connected in series or in parallel with one another. As a result, the controller can set, in particular, whether those sides of the DC/DC converters which face the rectifier are connected in parallel or in series with one another. As a result, the controller can set whether the current-carrying capacity is multiplied by connecting the rectifiers in parallel or whether the respective operating voltage is divided according to the number of DC/DC converters by connecting the DC/DC converters in series. The controller controls the switch unit to connect the DC/DC converters in parallel with one another in a single-phase state.

In a multiphase state, the controller controls the switch unit to connect the DC/DC converters in series. This relates, in particular, to the series or parallel connection of the respective intermediate circuit capacitors or of the switch units of the relevant DC/DC converters. If connections which are switchable (for instance by means of semiconductor switches or by means of electromechanical switches inside the connections) are also provided between the phase contacts of the AC voltage interface, these connections between the phases or phase contacts are established if the single-phase state is provided and are disconnected if the multiphase state is provided. It is possible to provide a capture device which captures the use state at the AC interface and captures, in particular, whether one or more phases of the interface are used. If a plurality of phases are used, the multiphase state is set, and, if only one phase is used, the single-phase state is set. The capture device may be part of the controller or may be connected upstream of the latter in order to provide the controller with appropriate information.

The controller, a part of the controller or a direct or indirectly linked control unit may be provided in order to control the DC/DC converters or their switch units and/or in order to control switching devices of the (active) rectifier. The controller which is connected to the switch unit in a controlling manner may be ordered by a superordinate controller which is also connected in a controlling manner to that control unit which controls the switch units of the DC/DC converter and/or the switching elements of the rectifier. However, the electrical division of the control can ultimately be implemented in different ways.

The rectifier may have a diode half-bridge which is connected to a neutral conductor contact of the AC voltage interface. In addition to the diode half-bridge, the rectifier comprises half-bridges having switch units, wherein each of these half-bridges is assigned to a phase of the AC voltage interface or is connected thereto (for example via inductances).

As mentioned, the rectifier is preferably in the form of an active rectifier. In this case, the rectifier comprises one or more half-bridges which each comprise a series circuit comprising two switching elements. The rectifier is preferably in the form of an active power factor correction filter. In this case, the rectifier comprises a plurality of half-bridge circuits which are connected to the AC interface via series inductances. The connections are individual in this case, with the result that the series inductances also constitute an individual connection between the respective half-bridge and the phase contact of the AC voltage interface. As mentioned, for single-phase charging or in the single-phase state, provision may be made for the phase contacts to be connected to one another via corresponding connections. The rectifier may be in the form of a Vienna rectifier, in particular.

BRIEF DESCRIPTION OF THE DRAWING

The drawing FIGURE is used to explain the charging circuit described here in more detail.

DETAILED DESCRIPTION OF THE INVENTION

The FIGURE shows a vehicle electrical system having an exemplary charging circuit which is (statically) connected to a power supply system SN via the AC voltage interface IF. In this case, the supply power system has a three-phase design and comprises a neutral conductor N. There are therefore four contacts of the AC interface IF with three-phase contacts P1, P2, P3 and one contact for the neutral conductor N, which is referred to as a neutral conductor contact NK.

The charging circuit is connected to the power supply system SN which is a public power supply system, for example. The charging circuit comprises the AC voltage interface IF which is connected to a rectifier GR. Two DC/DC converters GW1, GW2, which are connected to one another in a configurable manner by means of a switch apparatus SV, are in turn connected to the rectifier. The rectifiers GW1, GW2 each comprise a transistor T1, T2, to which the secondary rectifier SG is connected. The secondary rectifier SG therefore forms the connection to a vehicle electrical system connection AN.

The rectifier comprises three half-bridges HB1 to HB3 which are each fully controllable. The connection points of the half-bridges HB1, HB2, HB3, which result from the series circuit of two switching elements, are each connected to the phase contacts P1 to P3 via inductances L1 to L3. The neutral conductor contact NK is connected to a diode half-bridge DH directly, that is to say without an additional inductance, which diode half-bridge also belongs to the rectifier GR. That rectifier which is connected between the AC voltage interface IF and the DC/DC converters GW1, GW2 is referred to as the rectifier in this case. The secondary rectifier GR which is connected downstream of the DC/DC converters GW1, GW2 is referred to as a secondary rectifier throughout in order to distinguish it from the rectifier mentioned first.

The half-bridges HB1 to HB3 and the diode half-bridge DH are each connected to two supply potentials V−, V+ by way of their ends. The supply potentials are implemented by means of appropriate busbars. The rectifiers are connected to one of these supply potentials, but not both. This allows a configurable series or parallel connection by means of the switch apparatus SV.

The first DC/DC converter GW1 is connected to the positive supply potential V+. A second supply potential of the DC/DC converter GW1 can be selectively connected to the other supply potential V− or to the positive supply potential of the second DC/DC converter via the switch apparatus SV. As a result, it is possible to choose whether both DC/DC converters GW1, GW2 are intended to be connected in series or in parallel with one another.

The second DC/DC converter has a negative supply potential which corresponds to the negative supply potential V− of the charging circuit. However, the second DC/DC converter GW2 also has a potential, namely the positive supply potential, which can be selectably connected to the first DC/DC converter or its negative supply potential or to the positive supply potential V+ of the charging circuit via the switch apparatus SV. For this purpose, the switch apparatus SV comprises a first switch S1. This switch allows the switchable connection of the negative supply potential of the first DC/DC converter GW1 to the positive supply potential of the second DC/DC converter GW2. If this switch S1 is closed, the inputs of the DC/DC converters or their intermediate circuit capacitors C1, C2 or their switch units SE1, SE2 are connected in series with one another and are therefore connected to the two supply potentials V+, V− of the charging circuit as a series circuit.

A second switch S2 allows the connection of the positive supply potential of the second voltage converter to the supply potential V+ of the charging circuit. Accordingly, there is a third switch S3 which connects the negative supply potential of the first DC/DC converter GW1 to the negative supply potential V+ of the charging circuit in a switchable manner. If the switches S2, S3 are closed, both DC/DC converters GW1, GW2 operate with the supply potential V−, V+ of the charging circuit, that is to say with the output voltage of the rectifier GR. A symbolically illustrated controller ST is connected to the switches S1 to S3 in a controlling manner.

In the illustrated switching state 2 of the switch apparatus SV, the switch S1 is closed and the switches S2, S3 are open. As a result, the DC/DC converters GW1, GW2 are connected in series with one another. In a switching state 1 (which is opposite the illustrated switching state), S1 is open and the switches S2, S3 are closed. As a result, the voltage converters are each directly connected to the rectifier GR; in other words, the DC/DC converters GW1, GW2 are connected in parallel with one another. The switches S2, S3 are open or closed at the same time. The switch S1 is open if the switches S2, S3 are closed. The switch S2 is closed if the switches S2, S3 are open. The switch S1 and the switches S2, S3 therefore preferably operate in a complementary manner with respect to one another (based on their switching state). This relates, in particular, to the active state of the circuit; in an inactive state of the circuit, the switches S1-S3 may be open.

The two DC/DC converters GW1, GW2 each comprise a series circuit of two capacitors, wherein the DC/DC converter GW1 has the capacitors CK1 and CK2 in a series circuit and the second DC/DC converter GW2 has the series circuit of the capacitors CK3 and CK4. The series circuits are each connected in parallel with the supply potentials of the respective DC/DC converters.

Each DC/DC converter GW1, GW2 comprises a switch unit which respectively has a series circuit of two switches. The connection point between these switches is connected to the associated primary coil. The connection point of the switch unit SE1 of the first DC/DC converter GW1 is therefore connected to the primary coil PW1 of the transistor T1, and the primary coil T2 of the second transistor T2 is connected to the connection point of the switch unit SE2 of the DC/DC converter GW2. The respectively opposite end of the primary winding P1, P2 is connected to the connection point of the series circuit of the corresponding series circuit of capacitors CK1 to CK4. One end of the respective primary winding P1, P2 is therefore connected to a capacitive voltage divider of the relevant DC/DC converter GW1, GW2. The capacitive voltage divider is formed by the series circuit of the two capacitors CK1, CK2 and CK3 and CK4. A secondary rectifier SG is connected downstream of the transistors T1, T2 or is connected via the secondary windings thereof.

The secondary rectifier SG may have two rectifier circuits, wherein a first of these rectifier circuits is connected to the first transistor T1 and a second of these rectifier circuits is connected to the second transistor T2. The rectifier circuits may each be constructed as a Gratz circuit. In order to design the charging circuit to be capable of feedback, the secondary rectifier may have controllable rectifier circuits. Instead of diodes, controllable semiconductor switches can be used in this case. As a result, power can also be applied to the vehicle electrical system connection AN and can be chopped by the secondary rectifier in a feedback state in order to transmit the chopped signal, via the transistors and the switch units SE1, SE2, to the rectifier GR which likewise contributes to feedback to the power supply system SN via the AC voltage interface IF.

For the sake of better clarity, the secondary rectifier SG is only schematically illustrated as a dashed rectangle.

Dotted lines are used to illustrate two connections V1, V2 between phase contacts or phases of the AC voltage interface and the input of the rectifier GR. The connections V1, V2 are present if the charging circuit is in the single-phase charging state, that is to say if the AC voltage interface is used in a single-phase manner. If the multiphase state is provided, in which the interface IF is used in a multiphase manner, the connections V1, V2 are not present.

In summary, the switch apparatus SV and the division into two DC/DC converters GW1, GW2 allow a configurable combination of the voltage converters. In this case, the switch S1 can be considered to be a serial switch (since the DC/DC converters are connected in series if the switch S1 is closed). The switches S2, S3 can be considered to be parallel switches since the DC/DC converters GW1, GW2 are connected in parallel with one another when the switches S2, S3 are closed. The switching states of the switch S1, on the one hand, and of the switches S2, S3 are in opposition. The switch S2 is assigned to a positive supply potential and the switch S3 is assigned to a negative supply potential. However, provision may also be made for all switches to be open, for example in an inactive mode or in a fault mode.

Instead of capacitively coupling the transistors or the associated primary coils P1, P2, other types of coupling or types of connection are also possible, for instance in the case of switch units which are each in the form of a full-bridge. However, the FIGURE shows switch units SE1, SE2 which are in the form of a half-bridge, in which case the capacitors CK1 to CK4 can likewise each be considered to be half-bridges (in particular capacitive half-bridges), wherein the primary coils P1, P2 are connected between the respective connection points of the switch units SE1, SE2 and the respective capacitive voltage dividers CK1, CK2; CK3, CK4.

As mentioned, the secondary rectifier SG may be passive, in particular if the charging circuit is unidirectional, or may be active if the charging circuit is bidirectional, that is to say is capable of feedback. In the last-mentioned case, the secondary rectifier comprises a fully controlled H-bridge for each transistor. In this case, each H-bridge is connected to one of the two transformers T1, T1.

A vehicle electrical system may comprise the charging circuit (in particular the charging circuit illustrated) and a vehicle electrical system section connected thereto. The vehicle electrical system section has at least one rechargeable battery and may also have at least one (vehicle-side) load and/or a (vehicle-side) electrical energy source. This vehicle electrical system section would be connected to the charging circuit on the right, as illustrated in the FIGURE, and would be connected to the connection AN, for example.

The invention claimed is:

1. A vehicle-side charging circuit, comprising:
an AC voltage interface;
a rectifier connected to said AC voltage interface;
first and second DC/DC converters, said DC/DC converters being DC-isolating and each having at least one intermediate circuit capacitor and at least one switch unit;
a vehicle electrical system connection connected to said rectifier via said DC/DC converters; and
a switch apparatus configured to selectively connect said first and second DC/DC converters to one another, said switch apparatus being configured to connect said intermediate circuit capacitors and said switch units of said DC/DC converters in parallel with one another in a first switching state and to connect said intermediate circuit capacitors and said switch units in series with one another in a second switching state.

2. The vehicle-side charging circuit according to claim 1, wherein each of said first and second DC/DC converters has a transformer with a primary winding connected to said switch unit of the respective said DC/DC converter.

3. The vehicle-side charging circuit according to claim 1, further comprising a secondary rectifier with at least a first rectifier circuit and a second rectifier circuit, wherein said first rectifier circuit is connected to said first DC/DC converter in a DC-isolating manner and said second rectifier circuit is connected to said second DC/DC converter in a DC-isolating manner, and wherein said first and second rectifier circuits connect said first and second DC/DC converters to said vehicle electrical system connection.

4. The vehicle-side charging circuit according to claim 1, wherein each of said switch units of said first and second voltage converters comprises two switches connected in series.

5. The vehicle-side charging circuit according to claim 1, wherein said rectifier has one or more switchable half-bridges connected to said AC voltage interface directly or via series inductances.

6. The vehicle-side charging circuit according to claim 5, wherein the AC voltage interface has a single-phase or multiphase configuration.

7. The vehicle-side charging circuit according to claim 5, wherein the AC voltage interface is equipped with a plurality of phase contacts, wherein the phase contacts are connected to one another by means of connections in a single-phase state and are individually connected to individual half-bridges in a multiphase state.

8. The vehicle-side charging circuit according to claim 1, further comprising a controller connected to said switch unit, wherein said controller is configured to control said switch unit to connect said DC/DC converters in parallel in a single-phase state and to control said switch unit to connect said DC/DC converters in series in a multiphase state.

9. The vehicle-side charging circuit according to claim 1, wherein said rectifier has a diode half-bridge connected to a neutral conductor contact of said AC voltage interface.

10. The vehicle-side charging circuit according to claim 1, wherein said rectifier is an active rectifier or an active power factor correction filter.

* * * * *